US012585152B2

(12) United States Patent
Hsu et al.

(10) Patent No.: US 12,585,152 B2
(45) **Date of Patent: \*Mar. 24, 2026**

(54) DISPLAY DEVICE

(71) Applicant: Innolux Corporation, Miaoli County (TW)

(72) Inventors: Yu-Chun Hsu, Miaoli County (TW); Wei-Ming Chu, Miaoli County (TW); Yi-Hui Lee, Miaoli County (TW); Yung-Chih Cheng, Miaoli County (TW); Kuan-Chou Chen, Miaoli County (TW); Sheng-Nan Fan, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 341 days.

This patent is subject to a terminal disclaimer.

(21) Appl. No.: 18/331,183

(22) Filed: Jun. 8, 2023

(65) Prior Publication Data

US 2024/0027811 A1 Jan. 25, 2024

Related U.S. Application Data

(60) Provisional application No. 63/390,639, filed on Jul. 20, 2022.

(30) Foreign Application Priority Data

Apr. 14, 2023 (CN) .......................... 202310400863.7

(51) Int. Cl.
*G02F 1/1333* (2006.01)
*F21V 8/00* (2006.01)
(Continued)

(52) U.S. Cl.
CPC .......... *G02F 1/133342* (2021.01); *G02B 1/11* (2013.01); *G02B 6/0043* (2013.01);
(Continued)

(58) Field of Classification Search
None
See application file for complete search history.

(56) References Cited

U.S. PATENT DOCUMENTS 12,211,455 B2 * 1/2025 Hsu .................... H04M 1/72454
2021/0294019 A1 * 9/2021 Chen .................... G02B 6/0053
(Continued)

FOREIGN PATENT DOCUMENTS

| TW | I240124 | 9/2005 |
| TW | 200745591 | 12/2007 |
| TW | 201643516 | 12/2016 |

OTHER PUBLICATIONS

"Office Action of Taiwan Counterpart Application", issued on Aug. 22, 2025, p. 1-p. 6.

*Primary Examiner* — Phu Vu
(74) *Attorney, Agent, or Firm* — JCIPRNET

(57) ABSTRACT

A display device, including a first display panel, a second display panel, and a first optical structure layer, is provided. The first display panel has a first display surface emitting light toward a first direction. The second display panel has a second display surface emitting light toward a second direction, wherein the first direction is different from the second direction. The first optical structure layer is disposed on the first display panel, wherein a glossiness of the first optical structure layer is between 4 GU and 35 GU, and a reflectivity of specular component included (SCI) of the first optical structure layer is between 3% and 6%. The display device provided by the disclosure can reduce the influence of ambient light from the outside on a displayed image.

20 Claims, 11 Drawing Sheets

(51) Int. Cl.
    *G02B 1/11*         (2015.01)
    *G02B 1/115*      (2015.01)
    *G02F 1/1335*     (2006.01)

(52) U.S. Cl.
    CPC ..... *G02B 6/0063* (2013.01); *G02F 1/133502*
        (2013.01); *G02F 1/133553* (2013.01); *G02B*
                             *1/115* (2013.01)

(56)                 References Cited

U.S. PATENT DOCUMENTS

| | | | |
|---|---|---|---|
| 2023/0408730 A1* | 12/2023 | Hsu .......................... | G02B 1/11 |
| 2024/0272342 A1* | 8/2024 | Kim ..................... | G02B 5/3033 |
| 2025/0111831 A1* | 4/2025 | Hsu ..................... | G09G 3/3406 |

* cited by examiner

C

EL

TFT d1

100c

CLCD3

CLCD2

CLCD1

AL d1

100d

FML

CF

EP

TFT d1

100e

110: CLCD1,TE1,BE1,SL1
120: CLCD2,TE2,BE2,SL2
130: CLCD3,TE3,BE3,SL3

DISPLAY DEVICE

CROSS-REFERENCE TO RELATED APPLICATION

This application claims the priority benefits of U.S. provisional application Ser. No. 63/390,639, filed on Jul. 20, 2022, and China application serial no. 202310400863.7, filed on Apr. 14, 2023. The entirety of each of the above-mentioned patent applications is hereby incorporated by reference herein and made a part of this specification.

BACKGROUND

Technical Field

The disclosure relates to a display device, and in particular to a double-sided display device.

Description of Related Art

When the display device is used outdoors, ambient light from the outside irradiates the display device to generate reflected light, so that an image displayed on the display device is interfered by the reflected light, causing a decrease in contrast, resulting in a decrease in display quality.

Furthermore, the conventional double-sided liquid crystal display device has a relatively large thickness due to the inclusion of two backlight modules and consumes a relatively large amount of power when displaying an image.

SUMMARY

The disclosure provides a display device, which can reduce the influence of ambient light from the outside on a displayed image and can have a relatively small thickness and/or can reduce power consumption.

A display device provided according to some embodiments of the disclosure includes a first display panel, a second display panel, and a first optical structure layer. The first display panel has a first display surface emitting light toward a first direction. The second display panel has a second display surface emitting light toward a second direction. The first direction is different from the second direction. The first optical structure layer is disposed on the first display panel. A glossiness of the first optical structure layer is between 4 GU and 35 GU, and a reflectivity of specular component included (SCI) of the first optical structure layer is between 3% and 6%.

In order for the features and advantages of the disclosure to be more comprehensible, the following specific embodiments are described in detail in conjunction with the drawings.

BRIEF DESCRIPTION OF THE DRAWINGS

The drawings are included to provide a further understanding of the disclosure, and the drawings are incorporated into the specification and constitute a part of the specification. The drawings illustrate embodiments of the disclosure and serve to explain principles of the disclosure together with the description.

DETAILED DESCRIPTION OF DISCLOSED EMBODIMENTS

Figure 1A:
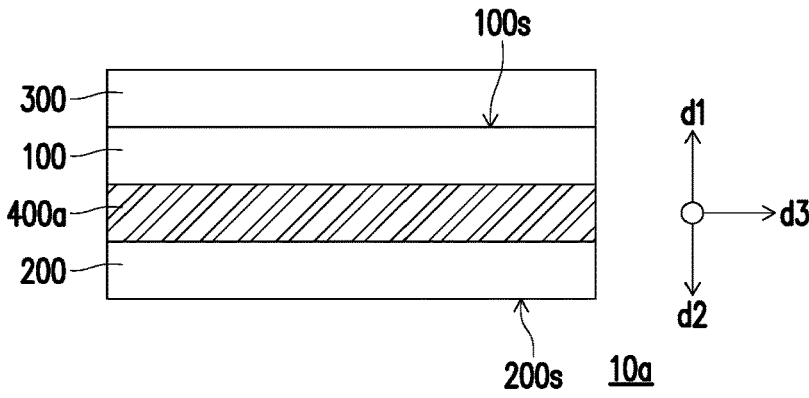
FIG. 1A is a simplified cross-sectional schematic view of a display device according to a first embodiment of the disclosure.

Reference will now be made in detail to the exemplary embodiments of the disclosure, examples of which are illustrated in the drawings. Wherever possible, the same reference numerals are used in the drawings and the description to refer to the same or similar parts.

The disclosure can be understood by referring to the following detailed description in conjunction with the drawings. It should be noted that in order to facilitate the understanding of the reader and the brevity of the drawings, multiple drawings in the disclosure only depict a part of an electronic device, and specific elements in the drawings are not drawn according to actual scale. In addition, the number and the size of each element in the drawings are for illustration only and are not intended to limit the scope of the disclosure.

Throughout the disclosure and the appended claims, certain terms may be used to refer to specific elements. It should be understood by persons skilled in the art that electronic device manufacturers may refer to the same element by different names. The disclosure does not intend to distinguish between elements with the same function but different names. In the following specification and claims, terms such as "including", "containing", and "having" are open-ended terms, so the terms should be interpreted as "containing but not limited to . . . ". Therefore, when the terms "including", "containing", and/or "having" are used in the description of the disclosure, the terms designate the presence of a corresponding feature, region, step, operation, and/or component, but do not exclude the presence of one or more corresponding features, regions, steps, operations, and/or components.

Directional terms such as "upper", "lower", "front", "rear", "left", and "right" mentioned in the disclosure are only directions with reference to the drawings. Therefore, the used directional terms are used to illustrate, but not to limit, the disclosure. In the drawings, each drawing illustrates the general characteristics of a method, a structure, and/or a material used in a specific embodiment. However, the drawings should not be construed to define or limit the scope or nature covered by the embodiments. For example, for clarity, relative sizes, thicknesses, and positions of various film layers, regions, and/or structures may be reduced or enlarged.

When a corresponding component (for example, a film layer or a region) is referred to as being "on another component", the component may be directly on the other component or there may be another component between the two. On the other hand, when a component is referred to as being "directly on another component", there is no component between the two unless otherwise stated in the specification. Also, when a component is referred to as being "on another component", the two have a top-down relationship in the top view direction, and the component may be above or below the other component, and the top-down relationship depends on the orientation of the device.

The terms "equal" or "same", "substantially", or "roughly" are generally interpreted as within 20% of a given value or range or interpreted as within 10%, 5%, 3%, 2%, 1%, or 0.5% of the given value or range.

Ordinal numbers such as "first" and "second" used in the specification and the claims are used to modify elements, and the terms do not imply and represent that the element(s) have any previous ordinal numbers, nor do they represent the order of a certain element and another element or the order of a manufacturing method. The use of the ordinal numbers is only to clearly distinguish between an element with a certain name and another element with the same name. The claims and the specification may not use the same terms, whereby a first component in the specification may be a second component in the claims.

It should be noted that in the following embodiments, features in several different embodiments may be replaced, recombined, and mixed to complete other embodiments without departing from the spirit of the disclosure. As long as the features of the various embodiments do not violate the spirit of the invention or conflict with each other, the features may be arbitrarily mixed and matched.

Electrical connection or coupling described in the disclosure may refer to direct connection or indirect connection. In the case of direct connection, terminals of elements on two circuits are directly connected or connected to each other by a conductor segment. In the case of indirect connection, there is a switch, a diode, a capacitor, an inductor, other suitable elements, or a combination of the above elements between the terminals of the elements on the two circuits, but not limited thereto.

In the disclosure, the measurement manner of thickness, length, width, and area may be by adopting an optical microscope, and the thickness may be obtained by measuring a cross-sectional image in an electron microscope, but not limited thereto. In addition, there may be a certain error in any two values or directions for comparison. If a first value is equal to a second value, it implies that there may be an error of about 10% between the first value and the second value. If a first direction is perpendicular to a second direction, an angle between the first direction and the second direction may be between 80 degrees and 100 degrees; and if the first direction is parallel to the second direction, the angle between the first direction and the second direction may be between 0 degrees and 10 degrees.

A display device of the disclosure may be a non-self-luminous display device or a self-luminous display device and may be a double-sided display device. The display device may, for example, include a diode, liquid crystal, a light emitting diode (LED), quantum dot (QD), fluorescence, phosphor, other suitable display media, or a combination of the above. The light emitting diode may, for example, include an organic light emitting diode (OLED), a mini LED, a micro LED, or a quantum dot LED (QDLED), but not limited thereto. It should be noted that the display device may be any permutation and combination of the above, but not limited thereto. In addition, the shape of the display device may be rectangular, circular, polygonal, a shape having curved edges, or other suitable shapes. The display device may have a peripheral system such as a driving system, a control system, and a light source system.

Figure 1B:
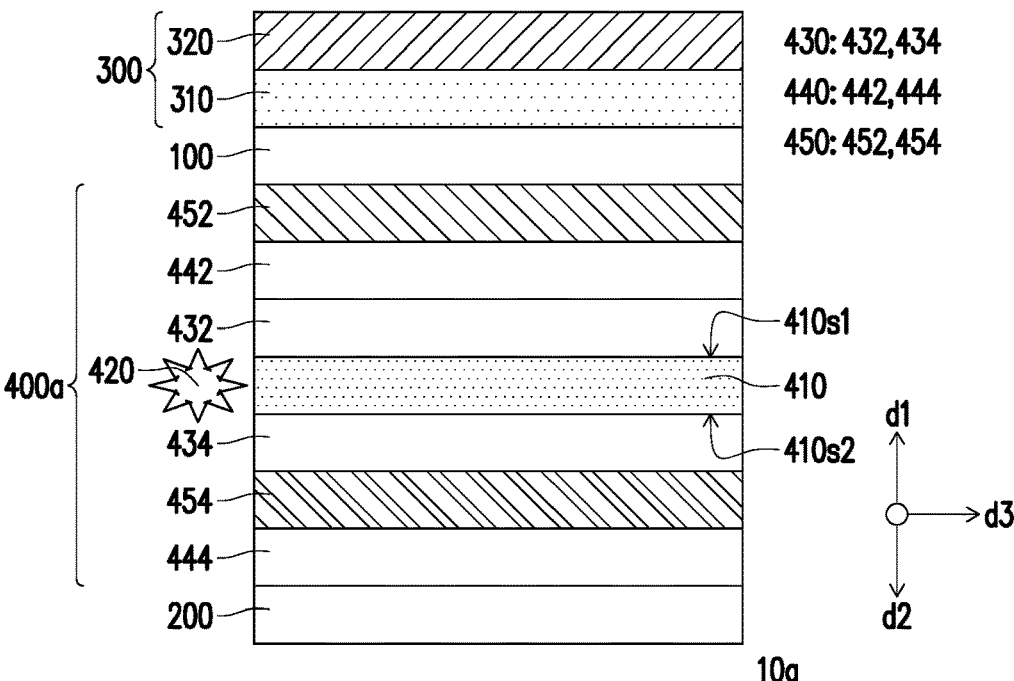
FIG. 1B is a cross-sectional schematic view of the display device according to an embodiment of FIG. 1A.

FIG. 1A is a simplified cross-sectional schematic view of a display device according to a first embodiment of the disclosure, and FIG. 1B is a cross-sectional schematic view of the display device according to an embodiment of FIG. 1A.

Please refer to FIG. 1A and FIG. 1B at the same time. A display device 10a of the embodiment is a double-sided display device, which includes a first display panel 100, a second display panel 200, and a first optical structure layer 300, but the disclosure is not limited thereto. The display device 10a of the embodiment may be, for example, applied to a digital gallery, a mobile phone, a tablet computer, a public information display, and/or other electronic devices that may be used outdoors or in environments with high-intensity ambient light.

In some embodiments, the display device 10a may further include an anti-pollution layer (not shown) to, for example, reduce the influence of pollution from the external environment and to, for example, prevent pollutants from easily adhering to a surface of the display device 10a facing the external environment.

The first display panel 100 has, for example, a first display surface 100s that emits light toward a first direction d1. In some embodiments, the first display panel 100 may be one of an organic light emitting diode display panel, a micro light emitting diode display panel, a mini light emitting diode display panel, a liquid crystal display panel, a cholesteric liquid crystal display panel, and an electronic paper display panel. In the embodiment shown in FIG. 1A and FIG. 1B, the first display panel 100 of the display device 10a is a liquid crystal display panel, but the disclosure is not limited thereto. In some embodiments, the first display panel 100 includes a substrate (not shown), an element layer (not shown), and a display medium (not shown). The substrate of the first display panel 100 may, for example, include a flexible substrate or an inflexible substrate, wherein the material of the substrate may, for example, include glass, plastic, or a combination thereof. For example, the substrate of the first display panel 100 may include quartz, sapphire, polymethyl methacrylate (PMMA), polycarbonate (PC), polyimide (PI), polyethylene terephthalate (PET), other suitable materials, or a combination of the above materials, but the disclosure is not limited thereto. The element layer of the first display panel 100 is, for example, disposed on the substrate and may, for example, include a circuit structure to drive the display medium. For example, the element layer of the first display panel 100 may include multiple scan lines, multiple data lines, an insulating layer, a capacitor, multiple transistors, and/or multiple electrodes, etc., but the disclosure is not limited thereto. The display medium of the first display panel 100 may be, for example, disposed on the element layer. In the embodiment, the display medium of the first display panel 100 includes liquid crystal molecules, and the liquid crystal molecules are liquid crystal molecules that may be rotated or switched by a vertical electric field or liquid crystal molecules that may be rotated or switched by a transverse electric field, but the disclosure is not limited thereto.

The second display panel 200 has, for example, a second display surface 200s that emits light toward a second direction d2, wherein the second direction d2 is different from the first direction d1. In the embodiment, the second direction d2 and the first direction d1 are opposite to each other, but the disclosure is not limited thereto. In other embodiments, the second direction d2 and the first direction d1 may be perpendicular to each other. In some embodiments, the second display panel 200 may also be one of an organic light emitting diode display panel, a micro light emitting diode display panel, a mini light emitting diode display panel, a liquid crystal display panel, a cholesteric liquid crystal display panel, and an electronic paper display panel. In the embodiment shown in FIG. 1A and FIG. 1B, the second display panel 200 of the display device is a liquid crystal display panel, that is, the second display panel 200 may be the same as or similar to the first display panel 100, but the disclosure is not limited thereto.

The first optical structure layer 300 is, for example, disposed on the first display surface 100s of the first display panel 100, wherein the first optical structure layer 300 may, for example, include an anti-glare layer 310 and an anti-reflection layer 320. In some embodiments, the anti-glare layer 310 may, for example, have the configuration of an anti-glare layer 310a, an anti-glare layer 310b, an anti-glare layer 310c, and an anti-glare layer 310d as shown in each of FIG. 1C to FIG. 1F below, but the disclosure is not limited thereto.

Figure 1C:
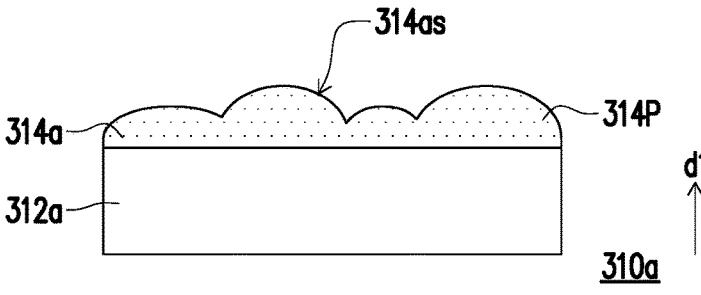
FIG. 1C is a partial cross-sectional schematic view of an anti-glare layer in a first optical structure layer according to an embodiment of FIG. 1A.

FIG. 1C is a partial cross-sectional schematic view of an anti-glare layer in a first optical structure layer according to an embodiment of FIG. 1A.

In some embodiments, as shown in FIG. 1C, the anti-glare layer 310a includes a cover plate 312a and an anti-glare film 314a.

The cover plate 312a is, for example, disposed on the first display panel 100 and is located between the first display panel 100 and the anti-glare film 314a in the first direction d1 (the direction in which light is emitted from the first display surface 100s of the first display panel 100). The cover plate 312a may, for example, have effects such as dustproof, anti-scratch, and water-proof to reduce the influence of the external environment on internal components of the first display panel 100 and may, for example, have light transmittance. In some embodiments, the material of the cover plate 312a may include glass, wherein the type or the composition of the glass is not particularly limited, and the glass may be, for example, aluminosilicate glass, lithium aluminosilicate glass, sodium calcium silicate glass, aluminosilicate glass, quartz glass, or other glass having light transmittance, but the disclosure is not limited thereto. In other embodiments, the material of the cover plate 312a may include an organic material, such as resin, acrylic, or other suitable organic materials.

The anti-glare film 314a is, for example, disposed on the cover plate 312a and has, for example, a rough surface 314as. Based on this, the surface of the anti-glare film 314a may be, for example, used to increase ambient light diffusion from the outside and/or reduce direct reflection of ambient light from the outside, so that the anti-glare film 314a has anti-glare property to improve the comfort of the user when viewing the first display panel 100 of the display device 10a. In some embodiments, the anti-glare film 314a may be formed through performing a coating process on the cover plate 312a (support body) to coat a curable composition, and then performing a curing process on the curable composition, wherein the coating process may include a spray coating process, and the curing process may include a photocuring process or a thermal curing process, but the disclosure is not limited thereto. In some other embodiments, the anti-glare film 314a may be formed through forming an anti-glare material layer (not shown) on the cover plate 312a, and then performing a transfer printing process using a mold (not shown) having a surface with a concave-convex structure.

In the embodiment, the anti-glare film 314a includes curable resin (for example, photocurable resin or thermal curable resin) and multiple silicon dioxide particles. The silicon dioxide particles included in the anti-glare film 314a may, for example, form multiple irregular protrusions 314P on the surface 314as of the anti-glare film 314a away from the cover plate 312a, so that the anti-glare film 314a has anti-glare property. In some embodiments, the arithmetic mean deviation (Ra) of the contour of the surface 314as of the anti-glare film 314a is between 0.1 μm and 0.5 μm (0.1 μm≤Ra≤0.5 μm), and the mean width (Rsm) of the contour of the surface 314as of the anti-glare film 314a is between 5 μm and 20 μm (5 μm≤Rsm≤50 μm). The arithmetic mean deviation (Ra) and the mean width (Rsm) of the contour of the surface 314as of the anti-glare film 314a may be, for example, obtained by measuring using KLA-Tencor P-6, but the disclosure is not limited thereto.

Figure 1D:
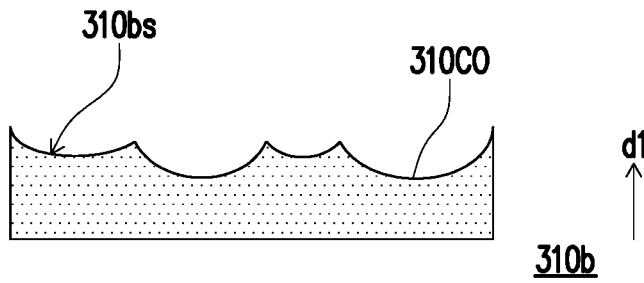
FIG. 1D is a partial cross-sectional schematic view of an anti-glare layer in a first optical structure layer according to another embodiment of FIG. 1A.

FIG. 1D is a partial cross-sectional schematic view of an anti-glare layer in a first optical structure layer according to another embodiment of FIG. 1A. It should be noted that FIG. 1D may continue to use the reference numerals and some content of the embodiment of FIG. 1C, wherein the same or similar reference numerals are adopted to indicate the same or similar elements, and the description of the same technical content is omitted.

In some embodiments, as shown in FIG. 1D, the anti-glare layer 310b is a cover plate, and the cover plate has a rough surface on a surface 310bs away from the first display panel 100.

In detail, the material included in the anti-glare layer 310b may be, for example, the same as or similar to the material included in the cover plate 312a of the foregoing embodiment. In some embodiments, the rough surface of the anti-glare layer 310b may be formed through performing an etching process on an anti-glare material layer (not shown), wherein hydrofluoric acid may be used for etching during the etching process, but the disclosure is not limited thereto. Based on this, the surface 310bs of the anti-glare layer 310b may, for example, have multiple concave surfaces 31000, and the surface 310bs of the anti-glare layer 310b may also be, for example, used to increase ambient light diffusion from the outside and/or reduce direct reflection of ambient light from the outside, so that the anti-glare layer 310b has anti-glare property to improve the comfort of the user when viewing the first display panel 100 of the display device 10a. In some embodiments, the arithmetic mean deviation (Ra) of the contour of the surface 310bs of the anti-glare layer 310b is between 0.1 µm and 0.5 µm ($0.1 \ \mu m \leq Ra \leq 0.5 \ \mu m$), and the mean width (Rsm) of the contour of the surface 310bs of the anti-glare layer 310b is between 5 µm and 20 µm ($5 \ \mu m \leq Rsm \leq 50 \ \mu m$). The measurement manner of the arithmetic mean deviation (Ra) and the mean width (Rsm) of the contour of the surface 310bs of the anti-glare layer 310b may be, for example, the same as or similar to the measurement manner of the arithmetic mean deviation (Ra) and the mean width (Rsm) of the contour of the surface 314as of the anti-glare film 314a, which will not be repeated here.

Figure 1E:
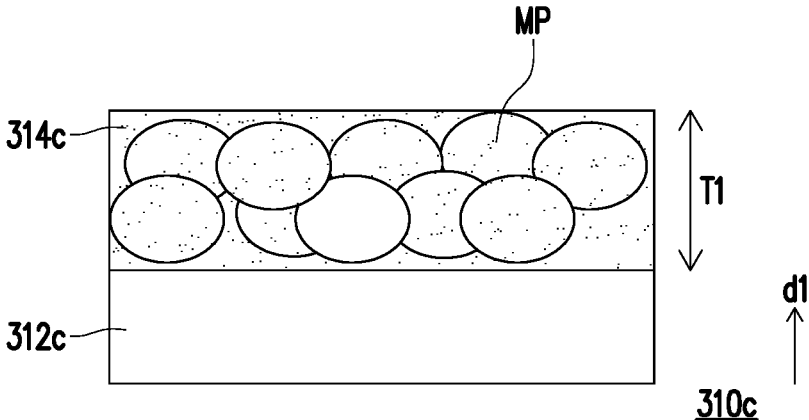
FIG. 1E is a partial cross-sectional schematic view of an anti-glare layer in a first optical structure layer according to yet another embodiment of FIG. 1A.

FIG. 1E is a partial cross-sectional schematic view of an anti-glare layer in a first optical structure layer according to yet another embodiment of FIG. 1A. It should be noted that FIG. 1E may continue to use the reference numerals and some content of the embodiment of FIG. 1C, wherein the same or similar reference numerals are adopted to indicate the same or similar elements, and the description of the same technical content is omitted.

In some embodiments, as shown in FIG. 1E, the anti-glare layer 310c includes a substrate 312c and a hard coating layer 314c.

In detail, in the embodiment, the substrate 312c is disposed on the first display panel 100 and is located between the first display panel 100 and the hard coating layer 314c in the first direction d1 (the direction in which light is emitted from the first display surface 100s of the first display panel 100). The substrate 312c, for example, has light transmittance and/or adhesion with the hard coating layer 314c and the first display panel 100. In some embodiments, the material of the substrate 312c may include an organic material, an inorganic material, or a combination thereof, but the disclosure is not limited thereto. In some other embodiments, the substrate 312c may include a polarizing plate, wherein the substrate 312c may include a structure in which a lower protective film (not shown), a polarizing sheet (not shown), and an upper protective film (not shown) are stacked in this order in the first direction d1. The hard coating layer 314c is, for example, disposed on the substrate 312c, and the hard coating layer 314c includes, for example, curable resin (for example, photocurable resin or thermal curable resin) and multiple silicon dioxide particles MP. In some embodiments, the hard coating layer 314c may be formed through performing a coating process on the substrate 312c to coat a curable composition, and then performing a curing process on the curable composition, wherein the coating process may include a spray coating process, and the curing process may include a photocuring process or a thermal curing process, but the disclosure is not limited thereto. The silicon dioxide particles MP included in the hard coating layer 314c may be, for example, used to increase ambient light diffusion from the outside and/or reduce direct reflection of ambient light from the outside, so that the anti-glare layer 310c has anti-glare property. In some other embodiments, the silicon dioxide particles MP included in the hard coating layer 314c may form multiple irregular protrusions (not shown) on a surface of the hard coating layer 314c away from the substrate 312c, but the disclosure is not limited thereto. In some embodiments, a thickness T1 of the hard coating layer 314c is between 1 µm and 3 µm ($1 \ \mu m \leq T1 \leq 3 \ \mu m$), which may enable the hard coating layer 314c to have suitable hardness and/or strength, but the disclosure is not limited thereto.

Figure 1F:
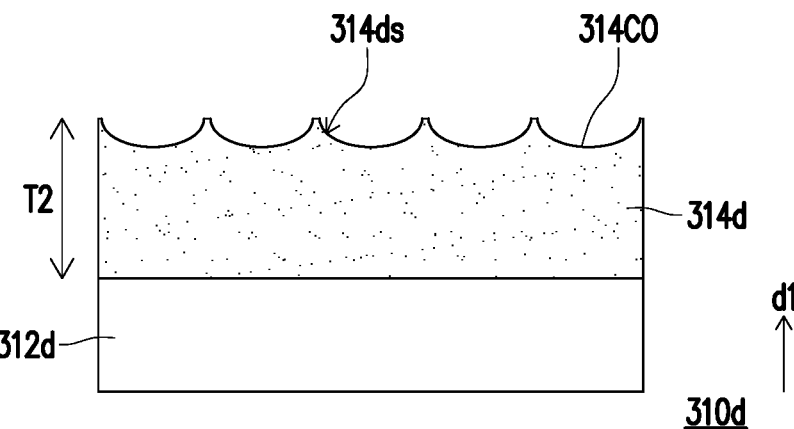
FIG. 1F is a partial cross-sectional schematic view of an anti-glare layer in a first optical structure layer according to still another embodiment of FIG. 1A.

FIG. 1F is a partial cross-sectional schematic view of an anti-glare layer in a first optical structure layer according to still another embodiment of FIG. 1A. It should be noted that FIG. 1F may continue to use the reference numerals and some content of the embodiment of FIG. 1E, wherein the same or similar reference numerals are adopted to indicate the same or similar elements, and the description of the same technical content is omitted.

In some embodiments, as shown in FIG. 1F, the anti-glare layer 310d includes a substrate 312d and a hard coating layer 314d.

The hard coating layer 314d is disposed on the substrate 312d, and the hard coating layer 314d has a rough surface on a surface 314ds away from the substrate 312d. In some embodiments, the rough surface of the hard coating layer 314d may be formed through performing an etching process on a hard coating material layer (not shown), wherein hydrofluoric acid may be used for etching during the etching process, but the disclosure is not limited thereto. Based on this, the surface 314ds of the hard coating layer 314d may, for example, have multiple concave surfaces 314CO, and the surface 314ds of the hard coating layer 314d may also be, for example, used to increase ambient light diffusion from the outside and/or reduce direct reflection of ambient light from the outside, so that the hard coating layer 314d has anti-glare property to improve the comfort of the user when viewing the first display panel 100 of the display device 10a. In some embodiments, the arithmetic mean deviation (Ra) of the contour of the surface 314ds of the hard coating layer 314d is between 0.1 µm and 0.5 µm ($0.1 \ \mu m \leq Ra \leq 0.5 \ \mu m$), and the mean width (Rsm) of the contour of the surface 314ds of the hard coating layer 314d is between 5 µm and 20 µm ($5 \ \mu m \leq Rsm \leq 50 \ \mu m$). The measurement manner of the arithmetic mean deviation (Ra) and the mean width (Rsm) of the contour of the surface 314ds of the hard coating layer 314d may be, for example, the same as or similar to the measurement manner of the arithmetic mean deviation (Ra) and the mean width (Rsm) of the contour of the surface 314as of the anti-glare film 314a of the foregoing embodiment, which will not be repeated here. In some embodiments, a thickness T2 of the hard coating layer 314d is between 1 µm and 3µm ($1 \ \mu m \leq T2 \leq 3 \ \mu m$), which may enable the hard coating layer 314d to have suitable hardness and/or strength, but the disclosure is not limited thereto.

Figure 1G:
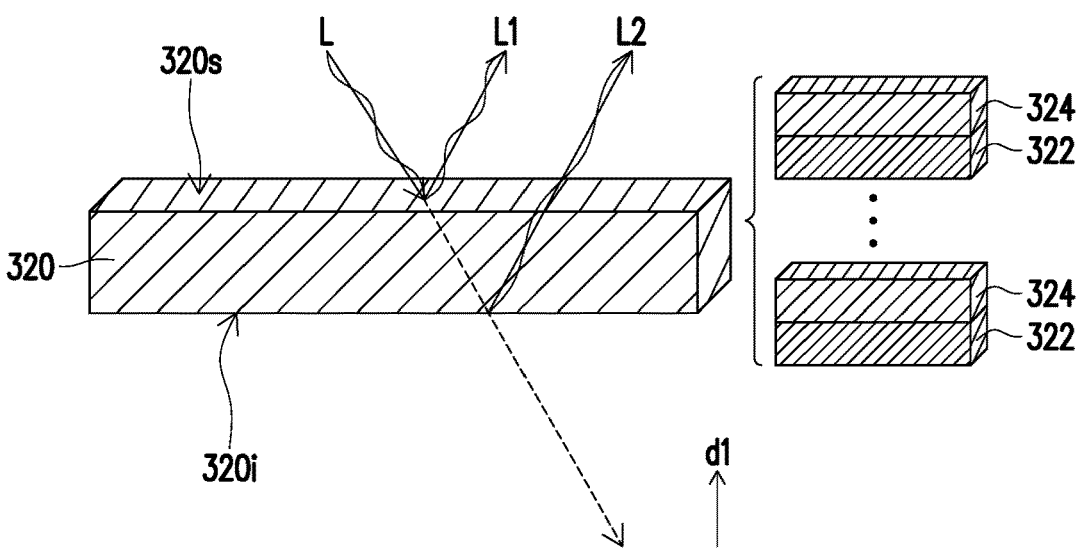
FIG. 1G is a partial cross-sectional schematic view of an anti-reflection layer in a first optical structure layer according to an embodiment of FIG. 1A.

FIG. 1G is a partial cross-sectional schematic view of an anti-reflection layer in a first optical structure layer according to an embodiment of FIG. 1A.

The anti-reflection layer 320 is, for example, disposed on the anti-glare layer 310. The anti-reflection layer 320 may be, for example, used to reduce the reflectivity of ambient light from the outside to improve the image quality displayed by the first display panel 100 of the display device 10a, wherein reference may be, for example, made to FIG. 1G for the manner in which the anti-reflection layer 320 reduces the reflectivity of ambient light from the outside. For example, when an ambient light L from the outside irradiates the anti-reflection layer 320, a first reflected light L1 reflected by a surface 320s of the anti-reflection layer 320 away from the first display panel 100 and a second reflected light L2 reflected by an interface 320i between the anti-reflection layer 320 and the remaining film layers are generated (for example, an interface between adjacent film layers in the anti-reflection layer 320 or an interface between the anti-reflection layer 320 and the anti-glare layer 310), wherein the first reflected light L1 and the second reflected light L2 have substantially opposite phases, so that destructive interference occurs between the first reflected light L1 and the second reflected light L2 to reduce the amplitude of the total reflected light reflected by the anti-reflection layer 320, so as to reduce reflectivity. The anti-reflection layer 320 may be, for example, a laminate, wherein the laminate may, for example, include high refractive index sublayers 322 and low refractive index sublayers 324 stacked alternately, and the total number of the high refractive index sublayers 322 and the low refractive index sublayers 324 is, for example, greater than or equal to 4. For example, the anti-reflection layer 320 may, for example, include a four-layer film layer of the high refractive index sublayers 322 and the low refractive index sublayers 324 overlapping with each other; or the anti-reflection layer 320 may, for example, include a ten-layer film layer of the high refractive index sublayers 322 and the low refractive index sublayers 324 overlapping with each other, but the disclosure is not limited thereto. The formation method of the high refractive index sublayers 322 and the low refractive index sublayers 324 included in the anti-reflection layer 320 may be, for example, by using physical vapor deposition, which may, for example, include vapor deposition, ion plating, sputter plating, or other suitable methods, but the disclosure is not limited thereto. In some embodiments, the material of the high refractive index sublayer 322 may include indium tin oxide (ITO), but the disclosure is not limited thereto. In some other embodiments, the material of the high refractive index sublayer 322 may include $Nb_2O_5$, other suitable oxides, or a combination thereof, and the remaining oxides may be, for example, $TiO_2$, $ZrO_2$, and $Ta_2O_5$, but the disclosure is not limited thereto. In some embodiments, the thickness of the single high refractive index sublayer 322 is between 1 nm and 500 nm or between 1 nm and 300 nm. In some embodiments, the material of the low refractive index sublayer 324 may include $SiO_2$, but the disclosure is not limited thereto. In other embodiments, the material of the low refractive index sublayer 324 may include fumed silica. In some embodiments, the thickness of the single low refractive index sublayer 324 is between 1 nm and 500 nm or between 1 nm and 300 nm. In addition, in some embodiments, the high refractive index sublayer 322 has an extinction coefficient (k) of between and 0.05 ($0.01 \leq k \leq 0.05$), so that the anti-reflection layer 320 may produce a smoke-like effect.

The number of film layers, the material, and the thickness of the high refractive index sublayer 322 and the low refractive index sublayer 324 in the anti-reflection layer 320 are, for example, listed in Table 1 and Table 2 below, but the disclosure is not limited thereto. In Table 1, the stacking order of the high refractive index sublayers 322 and the low refractive index sublayers 324 from top to bottom is a first low refractive index sublayer, a first high refractive index sublayer, a second low refractive index sublayer, and a second high refractive index sublayer. In Table 2, the stacking order of the high refractive index sublayers 322 and the low refractive index sublayers 324 from top to bottom is the first low refractive index sublayer, the first high refractive index sublayer, the second low refractive index sublayer, the second high refractive index sublayer, a third low refractive index sublayer, a third high refractive index sublayer, a fourth low refractive index sublayer, a fourth high refractive index sublayer, a fifth low refractive index sublayer, and a fifth high refractive index sublayer.

TABLE 1

The material of the high refractive index sublayer 322 includes $Nb_2O_5$, and the material of the low refractive index sublayer 324 includes $SiO_2$.

| | Thickness (nm) |
|---|---|
| First low refractive index sublayer | 86.7 |
| First high refractive index sublayer | 110.5 |
| Second low refractive index sublayer | 36.0 |
| Second high refractive index sublayer | 11.7 |

TABLE 2

The material of the high refractive index sublayer 322 includes ITO, and the material of the low refractive index sublayer 324 includes $SiO_2$.

| | Thickness (nm) |
|---|---|
| First low refractive index sublayer | 84.2 |
| First high refractive index sublayer | 72.09 |
| Second low refractive index sublayer | 14.14 |
| Second high refractive index sublayer | 25.73 |
| Third low refractive index sublayer | 134.55 |
| Third high refractive index sublayer | 15.07 |
| Fourth low refractive index sublayer | 27.56 |
| Fourth high refractive index sublayer | 259.91 |
| Fifth low refractive index sublayer | 24.96 |
| Fifth high refractive index sublayer | 21.47 |

In the embodiment, the glossiness of the first optical structure layer 300 is between 4 GU and 35 GU (4 GU≤ the glossiness of the first optical structure layer 300≤35 GU). For example, the glossiness of the first optical structure layer 300 may be between 4 GU and 30 GU (4 GU the glossiness of the first optical structure layer 300≤30 GU) or may be between 4 GU and 20 GU (4 GU≤ the glossiness of the first optical structure layer 300≤20 GU), but the disclosure is not limited thereto. The glossiness of the first optical structure layer 300 may be measured at an angle of 60° by, for example, using BYK-4446 and obtained by using JIS Z8741 glossiness standard, but the disclosure is not limited thereto. In some other embodiments, the glossiness of the first optical structure layer 300 may be measured at an angle of 20° or an angle of 85°.

In the embodiment, the reflectivity of specular component included (SCI) of the first optical structure layer 300 may be between 3% and 6% (3%≤ the reflectivity of SCI of the first optical structure layer 300≤6%). For example, the reflectivity of SCI of the first optical structure layer 300 may be between 4% and 6% (4%≤ the reflectivity of SCI of the first optical structure layer 300≤6%), but the disclosure is not limited thereto. The reflectivity of SCI of the first optical structure layer 300 may be obtained by measuring under the waveband of visible light by, for example, using Konica-Minolta CM-3600-d, but the disclosure is not limited thereto. For example, the reflectivity of SCI of the first optical structure layer 300 may be obtained by measuring under light with a wavelength of 550 nm.

In the embodiment, the transmittance of the first optical structure layer 300 is between 70% and 98% (70%≤ the transmittance of the first optical structure layer 300≤98%). For example, the transmittance of the first optical structure layer 300 may be between 70% and 95% (70%≤ the transmittance of the first optical structure layer 300≤95%), but the disclosure is not limited thereto. Based on this, the first optical structure layer 300 of the embodiment may provide relatively good light transmittance. The transmittance of the first optical structure layer 300 may be obtained by measuring under the waveband of visible light by, for example, using BYK-4725, but the disclosure is not limited thereto. For example, the transmittance of the first optical structure layer 300 may be obtained by measuring under light with a wavelength of 550 nm.

In the embodiment, through the first optical structure layer 300 disposed on the first display surface 100s of the first display panel 100 having the above structure, the glossiness of the first display panel 100 may be less than 5 GU, and the reflectivity of SCI of the first display panel 100 may be less than 3%. In addition, in the embodiment, the ratio of the reflectivity of specular component excluded (SCE) to the reflectivity of SCI of the first display panel 100 may be greater than 0.6 and less than 1 (0.6≤SCE of the first display panel 100/SCI of the first display panel 100≤1). The reflectivity of SCE of the first display panel 100 may be obtained by measuring under the waveband of visible light by, for example, using Konica-Minolta CM-3600-d, but the disclosure is not limited thereto. For example, the reflectivity of SCE of the first display panel 100 may be obtained by measuring under light with a wavelength of 550 nm. It should be noted that the measurement manner of the glossiness and SCI of the first display panel 100 may be, for example, the same as or similar to the measurement manner of the glossiness and SCI of the first optical structure layer 300, which will not be repeated here.

As shown in FIG. 1B, in some embodiments, the display device 10a further includes a backlight module 400a.

The backlight module 400a is, for example, disposed between the first display panel 100 and the second display panel 200. In some embodiments, the backlight module 400a includes a light guide plate 410 and a light source 420.

The light guide plate 410 has, for example, a first light emitting surface 410s1 facing the first display panel 100 and a second light emitting surface 410s2 facing the second display panel 200. In addition, the light guide plate 410 has, for example, high light transmittance and may be, for example, used to guide the travelling direction of light. In detail, the light guide plate 410 may provide light emitted by the light source 420 to each of the first display panel 100 and the second display panel 200.

In some embodiments, the first light emitting surface 410s1 and the second light emitting surface 410s2 of the light guide plate 410 may respectively have multiple first microstructures and multiple second microstructures, wherein the number of first microstructures per unit area may be different from the number of second microstructures per unit area. In addition, in some embodiments, the surface of the first microstructures is one of a curved surface and a plane, and the surface of the second microstructures is the other one of the curved surface and the plane, but the disclosure is not limited thereto. The first microstructures and the second microstructures of the light guide plate 410 may, for example, include the configurations as shown in FIG. 2A and FIG. 2B, so that light emitted by the light source 420 may be transmitted in the light guide plate 410, and a surface light source with good uniformity can be provided, but the disclosure is not limited thereto.

Figure 2A:
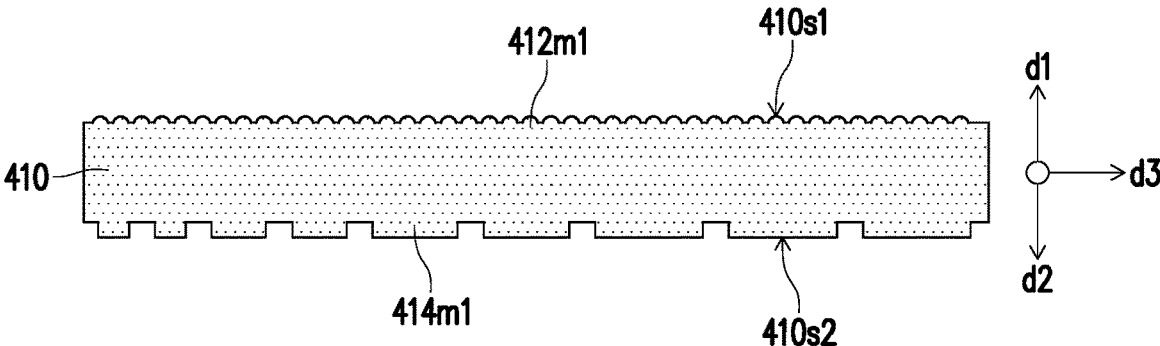
FIG. 2A is a partial cross-sectional schematic view of a light guide plate in a backlight module according to an embodiment of FIG. 1A.

FIG. 2A is a partial cross-sectional schematic view of a light guide plate in a backlight module according to an embodiment of FIG. 1A.

In some embodiments, as shown in FIG. 2A, the first light emitting surface 410s1 of the light guide plate 410 has multiple first microstructures 412m1, and the second light emitting surface 410s2 of the light guide plate 410 has multiple second microstructures 414m1, wherein the number of the first microstructures 412m1 per unit area is greater than the number of the second microstructures 414m1 per unit area. In addition, as shown in FIG. 2A, the surface (the first light emitting surface 410s1) of the first microstructures 412m1 is a curved surface, and the surface (the second light emitting surface 410s2) of the second microstructures 414m1 is a plane. In addition, the spacing between the adjacent first microstructures 412m1 may be, for example, substantially the same in a third direction d3 perpendicular to the first direction d1 or the second direction d2, and the spacing between the adjacent second microstructures 414m1 may, for example, become greater along the third direction d3, but the disclosure is not limited thereto.

Figure 2B:
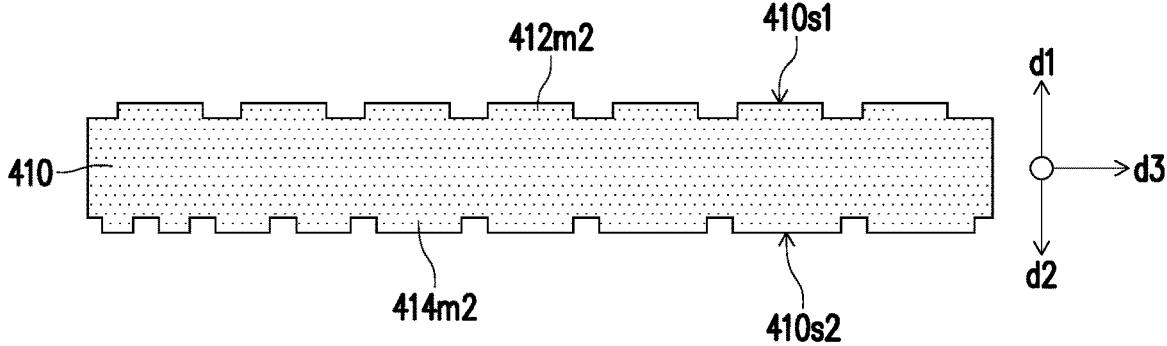
FIG. 2B is a partial cross-sectional schematic view of a light guide plate in a backlight module according to another embodiment of FIG. 1A.

FIG. 2B is a partial cross-sectional schematic view of a light guide plate in a backlight module according to another embodiment of FIG. 1A.

In some embodiments, as shown in FIG. 2B, the first light emitting surface 410s1 of the light guide plate 410 has multiple first microstructures 412m2, and the second light emitting surface 410s2 of the light guide plate 410 has multiple second microstructures 414m2, wherein the number of the first microstructures 412m2 per unit area is less than the number of the second microstructures 414m2 per unit area. In addition, as shown in FIG. 2B, the surface (the first light emitting surface 410s1) of the first microstructures 412m2 is a plane, and the surface (the second light emitting surface 410s2) of the second microstructures 414m2 is also a plane. In addition, the spacing between the adjacent first microstructures 412m2 may be, for example, substantially the same in the third direction d3 perpendicular to the first direction d1 or the second direction d2, and the spacing between the adjacent second microstructures 414m2 may, for example, become greater along the third direction d3, but the disclosure is not limited thereto.

The light source 420 is, for example, used to provide light to the light guide plate 410. Light provided by the light source 420 may be, for example, transmitted in the light guide plate 410, and provided to the first display panel 100 and the second display panel 200 through, for example, the respective first microstructures and second microstructures of the first light emitting surface 410s1 and the second light emitting surface 410s2 of the light guide plate 410. In the embodiment, the light source 420 is a side-type light source, so that the thickness of the display device 10a can be reduced. The light source 420 may, for example, include a light emitting diode. For example, the light source 420 may include a light emitting diode point light source, but the disclosure is not limited thereto.

In some embodiments, through the design of the respective first microstructures and second microstructures of the first light emitting surface 410s1 and the second light emitting surface 410s2 of the light guide plate 410, brightness of light emitted from the first light emitting surface 410s1 of the light guide plate 410 may be different from brightness of light emitted from the second light emitting surface 410s2 of the light guide plate 410, but the disclosure is not limited thereto.

As shown in FIG. 1B, in some embodiments, the backlight module 400a may further include a lower diffusion sheet 430, an upper diffusion sheet 440, and a brightness enhancement film 450.

In the embodiment, the lower diffusion sheet 430 includes a first lower diffusion sheet 432 disposed on the first light emitting surface 410s1 of the light guide plate 410 and a second lower diffusion sheet 434 disposed on the second light emitting surface 410s2 of the light guide plate 410. The first lower diffusion sheet 432 and the second lower diffusion sheet 434 may be, for example, used to diffuse light from the light guide plate 410 and have, for example, high light transmittance.

In the embodiment, the upper diffusion sheet 440 includes a first upper diffusion sheet 442 disposed on the first lower diffusion sheet 432 and a second upper diffusion sheet 444 disposed on the second lower diffusion sheet 434. The first upper diffusion sheet 442 and the second upper diffusion sheet 444 may be, for example, used to further diffuse light from the light guide plate 410 and may be, for example, used to conceal blemishes.

In the embodiment, the brightness enhancement film 450 includes a dual brightness enhancement film (DBEF) 452 and a crossed brightness enhancement film (X-BEF) 454 disposed between the second upper diffusion sheet 444 and the second lower diffusion sheet 434. The dual brightness enhancement film 452 may be, for example, used to improve the utilization efficiency of light from the light guide plate 410, and the crossed brightness enhancement film 454 may, for example, concentrate light from the light guide plate 410 at a center viewing angle.

From another point of view, the first lower diffusion sheet 432, the first upper diffusion sheet 442, and the dual brightness enhancement film 452 are, for example, stacked on the first light emitting surface 410s1 of the light guide plate 410 in this order in the first direction d1. In the embodiment, the first upper diffusion sheet 442 is directly disposed on the first lower diffusion sheet 432. In detail, there is no optical film layer disposed between the first upper diffusion sheet 442 and the first lower diffusion sheet 432, but there may be an air gap between the first upper diffusion sheet 442 and the first lower diffusion sheet 432 or an adhesive layer for adhering the two. Based on this, the first display panel 100 may receive uniform light from the first lower diffusion sheet 432 and the first upper diffusion sheet 442, so that the first display panel 100 can have a relatively wide viewing angle.

Figure 2C:
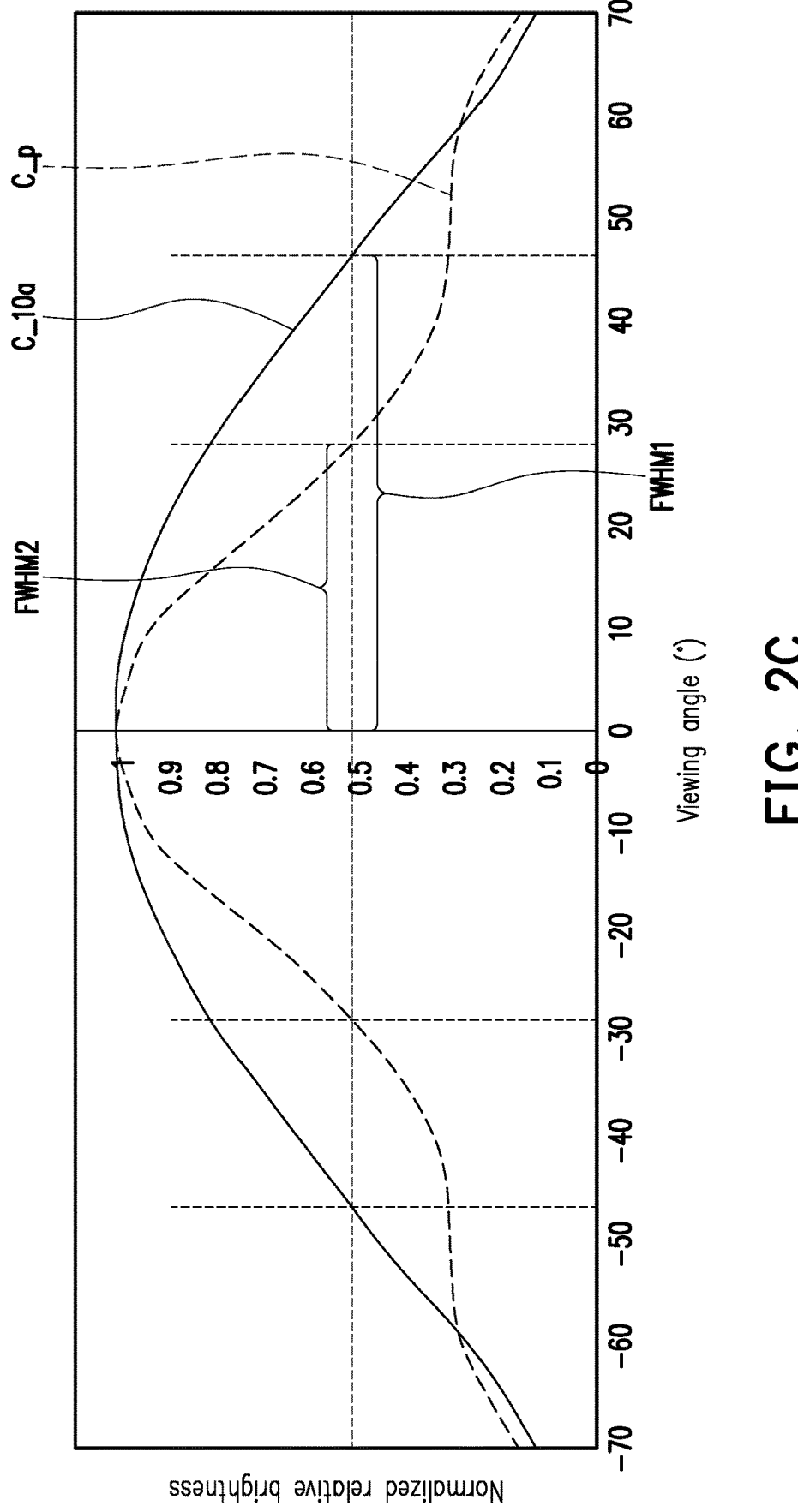
FIG. 2C is a graph of a relationship between brightness and viewing angle of a display device according to FIG. 1A and a conventional display device.

For example, as shown in FIG. 2C, FIG. 2C shows a relationship curve C_10a of brightness against viewing angle of light provided by the backlight module 400a of the display device 10a of the embodiment and a relationship curve C_p of brightness against viewing angle of light provided by any backlight module in a conventional double-sided display device, wherein the compositions of the backlight modules respectively included in the display device 10a and the conventional double-sided display device are shown in Table 3 below.

TABLE 3

| | Backlight module 400a of display device 10a | Any backlight module in conventional double-sided display device |
|---|---|---|
| Lamination composition of backlight module | Upper diffusion sheet 440 | Upper diffusion sheet |
| | — | X-BEF |
| | Lower diffusion sheet 430 | Lower diffusion sheet |
| | Light guide plate 410 | Light guide plate |
| | — | Reflection sheet |

TABLE 3-continued

| | Backlight module 400a of display device 10a | Any backlight module in conventional double-sided display device |
|---|---|---|
| Difference between angle of viewing angle corresponding to half of light intensity provided by backlight module and angle of center viewing angle | 45° | 25° |

Please refer to FIG. 2C and Table 3. The relationship curve C_10a provided by the backlight module 400a in the display device 10a of the embodiment has a relatively wide full width at half maximum FWHM1, wherein the difference between the angle of the viewing angle corresponding to half of the light intensity provided by the backlight module 400a and the angle of the center viewing angle is greater than 40 degrees, that is, light provided by the backlight module 400a has a relatively wide and flat distribution, so that the brightness distribution of the first display panel 100 of the display device 10a of the embodiment is uniform at each viewing angle, and the first display panel 100 can still have relatively high brightness at a wider viewing angle. In contrast, since the backlight module in the conventional double-sided display device includes the crossed brightness enhancement film disposed between the upper diffusion sheet and the lower diffusion sheet, light provided by the backlight module is concentrated at the center viewing angle, so that the relationship curve C_p has a relatively narrow full width at half maximum FWHM2, that is, the brightness of any display panel in the conventional double-sided display device rapidly decays with the increase in the viewing angle, so that the perception of the user when viewing the conventional display device is not good.

In addition, the second lower diffusion sheet 434, the crossed brightness enhancement film 454, and the second upper diffusion sheet 444 are, for example, laminated on the second light emitting surface 410s2 of the light guide plate 410 in this order in the second direction d2.

Based on this, through disposing the first optical structure layer 300 on the first display surface 100s of the first display panel 100, the first display panel 100 of the display device 10a of the embodiment can have relatively good anti-glare performance, which can effectively scatter ambient light from the outside to reduce the influence of reflection of ambient light from the outside when the user views the first display panel 100 of the display device 10a, so as to improve the display quality of the first display panel 100 of the display device 10a. Based on this, when the user views an electronic device (for example, a digital gallery, a mobile phone, a tablet computer, a public information display, or other suitable electronic devices) including the display device 10a of the embodiment, the user may experience an image displayed by the electronic device as a piece of paper.

Furthermore, the display device 10a of the embodiment omits the arrangement of a light guide plate compared with the conventional double-sided liquid crystal display device to have a relatively small thickness.

Figure 3A:
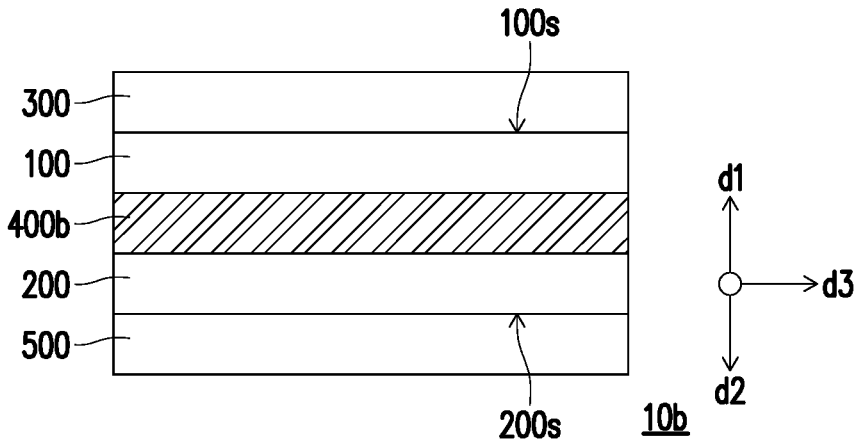
FIG. 3A is a simplified cross-sectional schematic view of a display device according to a second embodiment of the disclosure.
Figure 3B:
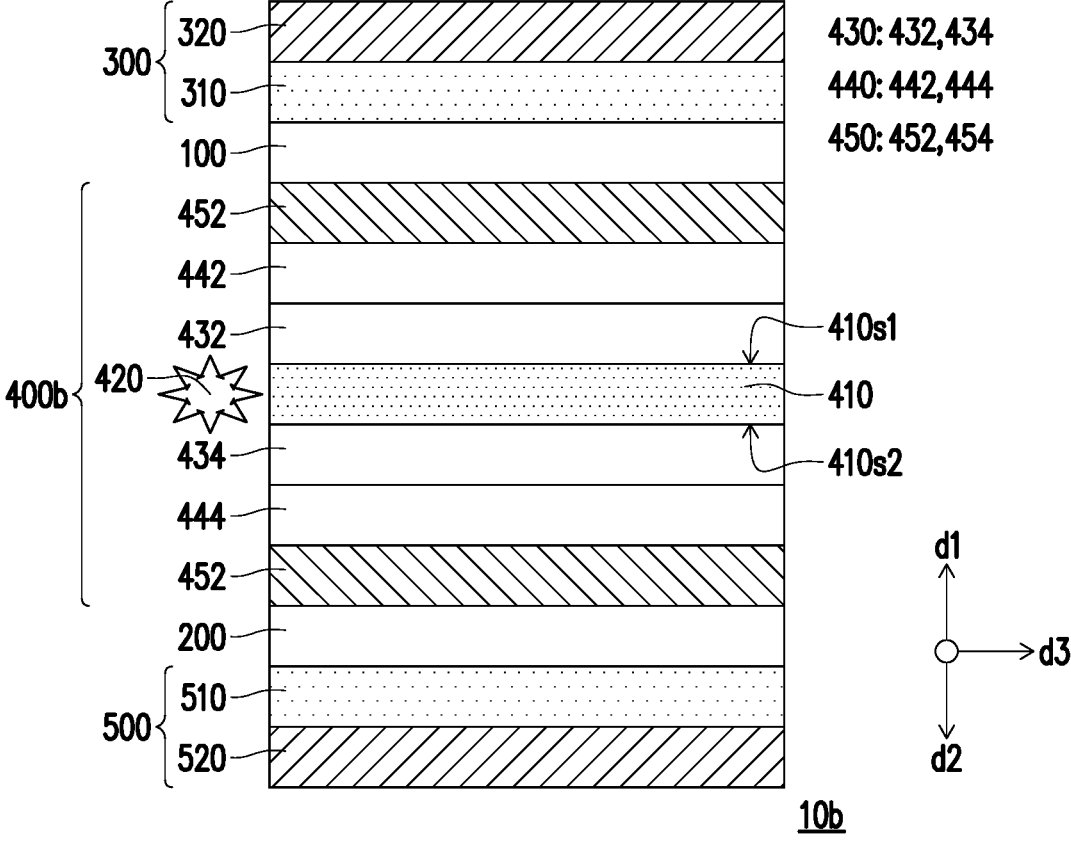
FIG. 3B is a cross-sectional schematic view of the display device according to an embodiment of FIG. 3A.

FIG. 3A is a simplified cross-sectional schematic view of a display device according to a second embodiment of the disclosure, and FIG. 3B is a cross-sectional schematic view of the display device according to an embodiment of FIG. 3A. It should be noted that the embodiment of FIG. 3A and FIG. 3B may continue to use the reference numerals and some content of the embodiment of FIG. 1A and FIG. 1B, wherein the same or similar reference numerals are adopted to denote the same or similar elements, and the description of the same technical content is omitted.

Please refer to FIG. 3A and FIG. 3B at the same time. The main difference between a display device 10b of the embodiment and the display device 10a is that the display device 10b further includes a second optical structure layer 500, wherein the second optical structure layer 500 is disposed on the second display surface 200s.

The structure included in the second optical structure layer 500 may be, for example, the same as or similar to that of the first optical structure layer 300. For example, the second optical structure layer 500 may include an anti-glare layer 510 and an anti-reflection layer 520, wherein the configurations of the anti-glare layer 510 and the anti-reflection layer 520 may be respectively the same as or similar to the configurations of the anti-glare layer 310 and the anti-reflection layer 320, so details will not be repeated here.

Therefore, in the embodiment, the glossiness of the second optical structure layer 500 is also between 4 GU and 35 GU (4 GU≤ the glossiness of the second optical structure layer 500≤35 GU). For example, the glossiness of the second optical structure layer 500 may be between 4 GU and 30 GU (4 GU≤ the glossiness of the second optical structure layer 500≤30 GU) or may be between 4 GU and 20 GU (4 GU≤ the glossiness of the second optical structure layer 500 20 GU), but the disclosure is not limited thereto. The measurement manner of the glossiness of the second optical structure layer 500 may be, for example, the same as or similar to the measurement manner of the glossiness of the first optical structure layer 300, which will not be repeated here.

In addition, in the embodiment, the reflectivity of SCI of the second optical structure layer 500 is also between 3% and 6% (3%≤ the reflectivity of SCI of the second optical structure layer 500≤6%). For example, the reflectivity of SCI of the second optical structure layer 500 may be between 4% and 6% (4%≤ the reflectivity of SCI of the second optical structure layer 500≤6%), but the disclosure is not limited thereto. The measurement manner of the reflectivity of SCI of the second optical structure layer 500 may be, for example, the same as or similar to the measurement manner of the reflectivity of SCI of the first optical structure layer 300, which will not be repeated here.

In addition, in the embodiment, in the second direction d2, the second light emitting surface 410s2 of the light guide plate 410 in a backlight module 400b is sequentially provided with the first lower diffusion sheet 432, the first upper diffusion sheet 442, and the dual brightness enhancement film 452 to cooperate with the second optical structure layer 500, so that the second display panel 200 also has uniform brightness at each viewing angle.

Based on this, through disposing the second optical structure layer 500 on the second display surface 200s of the second display panel 200, the second display panel 200 of the display device 10b of the embodiment can also have relatively good anti-glare performance, so as to improve the display quality of the display device 10b.

Figure 4A:
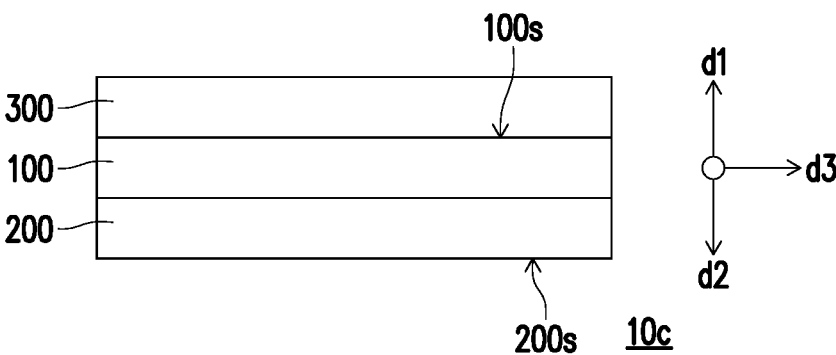
FIG. 4A is a simplified cross-sectional schematic view of a display device according to a third embodiment of the disclosure.
Figure 4B:
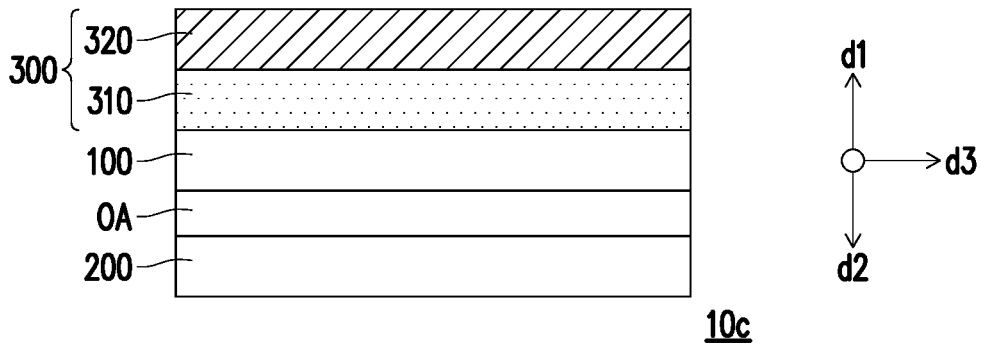
FIG. 4B is a cross-sectional schematic view of the display device according to an embodiment of FIG. 4A.

FIG. 4A is a simplified cross-sectional schematic view of a display device according to a third embodiment of the disclosure, and FIG. 4B is a cross-sectional schematic view of the display device according to an embodiment of FIG. 4A. It should be noted that the embodiment of FIG. 4A and FIG. 4B may continue to use the reference numerals and some content of the embodiment of FIG. 1A and FIG. 1B, wherein the same or similar reference numerals are adopted to denote the same or similar elements, and the description of the same technical content is omitted.

Please refer to FIG. 4A and FIG. 4B at the same time. The main difference between a display device 10c of the embodiment and the display device 10a is that the first display panel 100 and the second display panel 200 in the display device 10c are self-luminous display panels.

In detail, each of the first display panel 100 and the second display panel 200 may include multiple light emitting elements (not shown), which may emit various suitable color lights (for example, red light, green light, blue light, white light, etc.) or UV light, but the disclosure is not limited thereto. For example, the display media of the first display panel 100 and the second display panel 200 may include self-luminous materials, which may include diodes, organic light emitting diodes (OLED), inorganic light emitting diodes (LED) such as mini LED or micro LED, quantum dots (QD), QDLED, fluorescence, phosphor, other suitable materials, or combinations of the above materials, but the disclosure is not limited thereto.

Based on this, the display device 10c may not be provided with a backlight module to further reduce the thickness of the display device 10c.

Figure 5A:
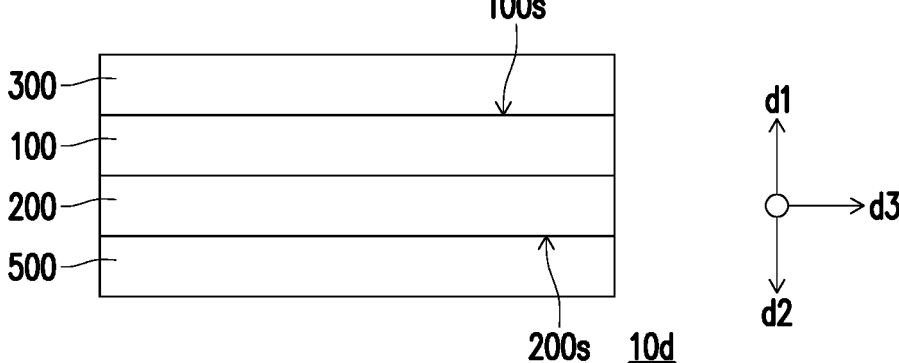
FIG. 5A is a simplified cross-sectional schematic view of a display device according to a fourth embodiment of the disclosure.
Figure 5B:
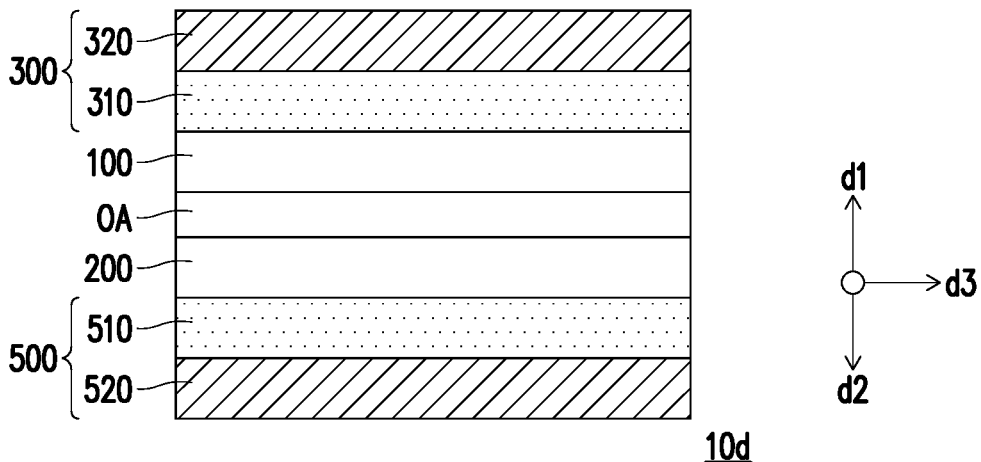
FIG. 5B is a cross-sectional schematic view of the display device according to an embodiment of FIG. 5A.

FIG. 5A is a simplified cross-sectional schematic view of a display device according to a fourth embodiment of the disclosure, and FIG. 5B is a cross-sectional schematic view of the display device according to an embodiment of FIG. 5A. It should be noted that the embodiment of FIG. 5A and FIG. 5B may continue to use the reference numerals and some content of the embodiment of FIG. 3A and FIG. 3B, wherein the same or similar reference numerals are adopted to denote the same or similar elements, and the description of the same technical content is omitted.

Please refer to FIG. 5A and FIG. 5B at the same time. The main difference between a display device 10d of the embodiment and the display device 10b is that the first display panel 100 and the second display panel 200 in the display device 10d are self-luminous display panels, wherein reference may be made to the display device 10c for the structure of the display device which will not be repeated here.

Figure 6A:
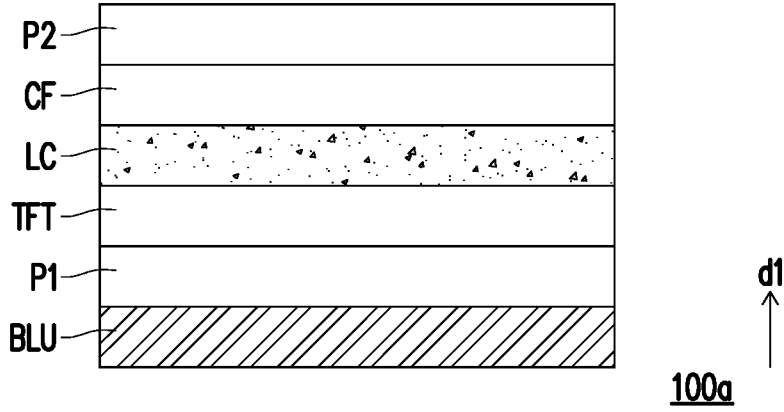
FIG. 6A to FIG. 6E illustrate various configurations of a first display panel or a second display panel in a display device according to an embodiment.
Figure 6B:
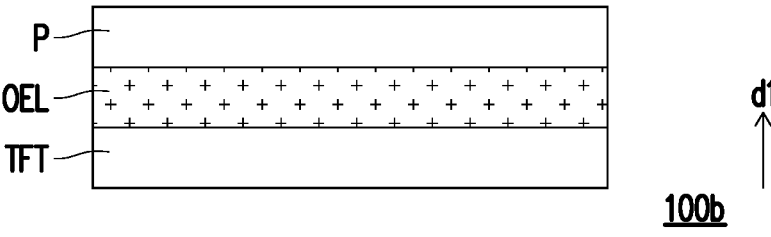
Figure 6C:
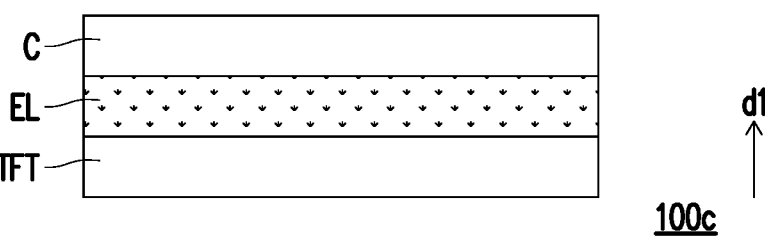
Figure 6D:
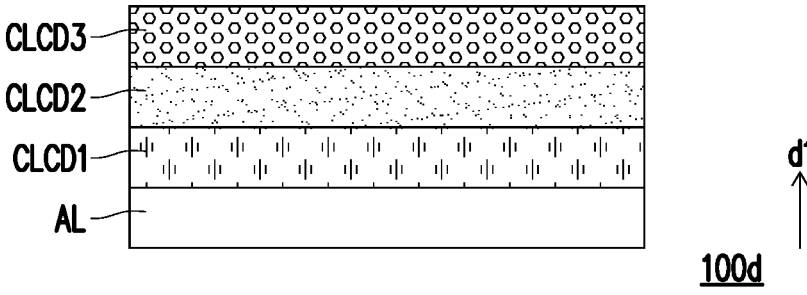
Figure 6E:
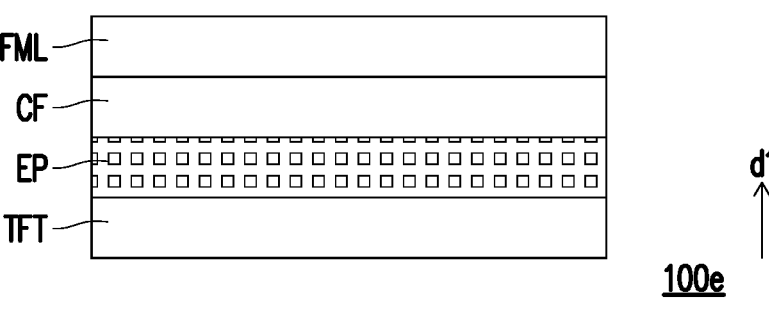

FIG. 6A to FIG. FIG. 6E illustrate the configurations of the first display panel 100 and respectively show the configurations of a first display panel 100a, a first display panel 100b, a first display panel 100c, a first display panel 100d, and a first display panel 100e. It is worth noting that reference may also be made to FIG. 6A to FIG. 6E for the configuration of the second display panel 200.

Please refer to FIG. 6A. The first display panel 100a is a liquid crystal display panel, which may, for example, include a backlight module BML, a polarizing layer P1, an active element array substrate TFT, a liquid crystal layer LC, a color filter substrate CF, and a polarizing layer P2, wherein the backlight module BML, the polarizing layer P1, the active element array substrate TFT, the liquid crystal layer LC, the color filter substrate CF, and the polarizing layer P2 are, for example, stacked in this order in the first direction d1. In some embodiments, the backlight module BML may be a part of the backlight module 400a or the backlight module 400b, but the disclosure is not limited thereto.

Please refer to FIG. 6B. The first display panel 100b is an organic light emitting diode display panel, which may, for example, include the active element array substrate TFT, an organic light emitting layer OEL, and a polarizing layer P, wherein the active element array substrate TFT, the organic light emitting layer OET, and the polarizing layer P are, for example, stacked in this order in the first direction d1. In some embodiments, the first display panel 100b may further include a color filter (not shown) disposed on the organic light emitting layer OEL, but the disclosure is not limited thereto.

Please refer to FIG. 6C. The first display panel 100c is a mini light emitting diode display panel or a micro light emitting diode display panel, which may, for example, include the active element array substrate TFT, a light emitting layer EL, and a filter layer C, wherein the active element array substrate TFT, the light emitting layer EL, and the filter layer C are, for example, stacked in this order in the first direction d1. In some embodiments, the light emitting layer EL may include a mini light emitting diode or a micro light emitting diode, and the filter layer CL may include a color filter layer, a quantum dot color filter layer, or a combination of the two, but the disclosure is not limited thereto.

Please refer to FIG. 6D. The first display panel 100d is a cholesteric liquid crystal display panel, which may, for example, include a light absorbing layer AL, a first choles-teric liquid crystal layer CLCD1, a second cholesteric liquid crystal layer CLCD2, and a third cholesteric liquid crystal layer CLCD3, wherein the light absorbing layer AL, the first cholesteric liquid crystal layer CLCD1, the second choles-teric liquid crystal layer CLCD2, and the third cholesteric liquid crystal layer CLCD3 are, for example, stacked in this order in the first direction d1.

Please refer to FIG. 6E. The first display panel 100e is an electronic paper display panel, which may, for example, include the active element array substrate TFT, an electro-phoretic layer EP, the color filter substrate CF, and a front light module FML, wherein the active element array sub-strate TFT, the electrophoretic layer EP, the color filter substrate CF, and the front light module FML are, for example, stacked in this order in the first direction d1. The electrophoretic layer EP may, for example, include multiple charged particles (not shown) and a fluid (not shown), wherein the charged particles may be dispersed in the fluid, but the disclosure is not limited thereto.

Figure 7:
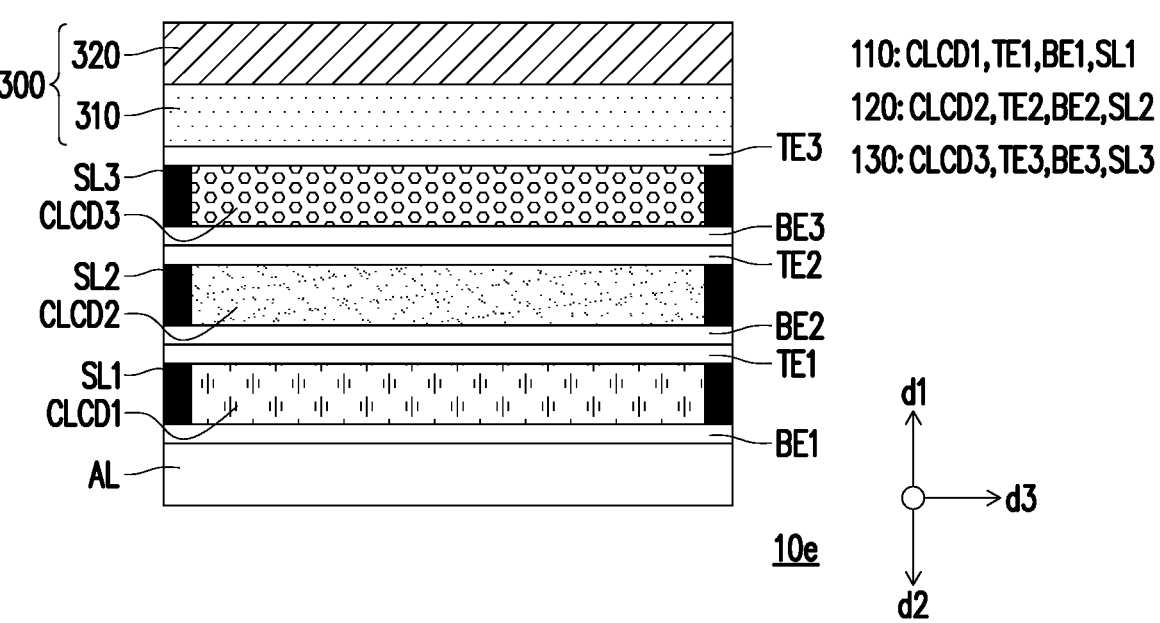
FIG. 7 is a cross-sectional schematic view of a display device according to a fifth embodiment of the disclosure.

FIG. 7 is a cross-sectional schematic view of a display device according to a fifth embodiment of the disclosure. It should be noted that the embodiment of FIG. 7 may continue to use the reference numerals and some content of the embodiment of FIG. 1B, wherein the same or similar reference numerals are adopted to indicate the same or similar elements, and the description of the same technical content is omitted.

Please refer to FIG. 7. The main difference between a display device 10e of the embodiment and the display device 10a is that the display device 10e is a cholesteric liquid crystal display device.

In detail, taking the first display panel 100 as an example, the first display panel 100 may, for example, include the light absorbing layer AL, a first cholesteric liquid crystal module 110, a second cholesteric liquid crystal module 120, and a third cholesteric liquid crystal module 130, wherein the light absorbing layer AL, the first cholesteric liquid crystal module 110, the second cholesteric liquid crystal module 120, and the third cholesteric liquid crystal module 130 are, for example, stacked in this order in the first direction d1.

The light absorbing layer AL may be, for example, used to absorb light that is not reflected by the first cholesteric liquid crystal module 110, the second cholesteric liquid crystal module 120, and the third cholesteric liquid crystal module 130, so as to improve the contrast of an image displayed by the display device 10e. In some embodiments, the material of the light absorbing layer AL may include a photoresist material or an ink.

The first cholesteric liquid crystal module 110 includes, for example, the first cholesteric liquid crystal layer CLCD1, an upper electrode TE1, a lower electrode BE1, and a sealant SL1. The first cholesteric liquid crystal layer CLCD1 may be, for example, used to reflect a first light having a first wavelength range, wherein the first light may be, for example, red light, but the disclosure is not limited thereto. The upper electrode TE1 and the lower electrode BE1 are, for example, respectively disposed on opposite sides of the first cholesteric liquid crystal layer CLCD1. Therefore, different voltages may be applied to the upper electrode TE1 and the lower electrode BE1 to generate a voltage difference to change the arrangement of liquid crystal molecules in the first cholesteric liquid crystal layer CLCD1, so that the first cholesteric liquid crystal layer CLCD1 may reflect the first light having the first wavelength range. The sealant SL1 may be, for example, disposed between the upper electrode TE1 and the lower electrode BE1, and may, for example, sur-round the first cholesteric liquid crystal layer CLCD1 to reduce the possibility of the first cholesteric liquid crystal layer CLCD1 flowing out.

The second cholesteric liquid crystal module 120 includes, for example, the second cholesteric liquid crystal layer CLCD2, an upper electrode TE2, a lower electrode BE2, and a sealant SL2. The second cholesteric liquid crystal layer CLCD2 may be, for example, used to reflect a second light having a second wavelength range, wherein the second light may be, for example, green light, but the disclosure is not limited thereto. The upper electrode TE2, the lower electrode BE2, and the sealant SL2 may be respectively the same as or similar to the upper electrode TE1, the lower electrode BE1, and the sealant SL1, so details will not be repeated here.

The third cholesteric liquid crystal module 130 includes, for example, the third cholesteric liquid crystal layer CLCD3, an upper electrode TE3, a lower electrode BE3, and a sealant SL3. The third cholesteric liquid crystal layer CLCD3 may be, for example, used to reflect a third light having a third wavelength range, wherein the third light may be, for example, blue light, but the disclosure is not limited thereto. The upper electrode TE3, the lower electrode BE3, and the sealant SL3 may be respectively the same as or similar to the upper electrode TE1, the lower electrode BE1, and the sealant SL1, so details will not be repeated here.

In the embodiment, the first optical structure layer 300 is disposed on the third cholesteric liquid crystal module 130, wherein reference may be made to the foregoing embodi-ments for the composition and the characteristics of the first optical structure layer 300, which will not be repeated here. In addition, it is worth noting that although FIG. 7 does not show the second display panel 200 of the display device 10e, the second display panel 200 may have the same or similar composition as the first display panel 100 of the embodi-ment.

Figure 8A:
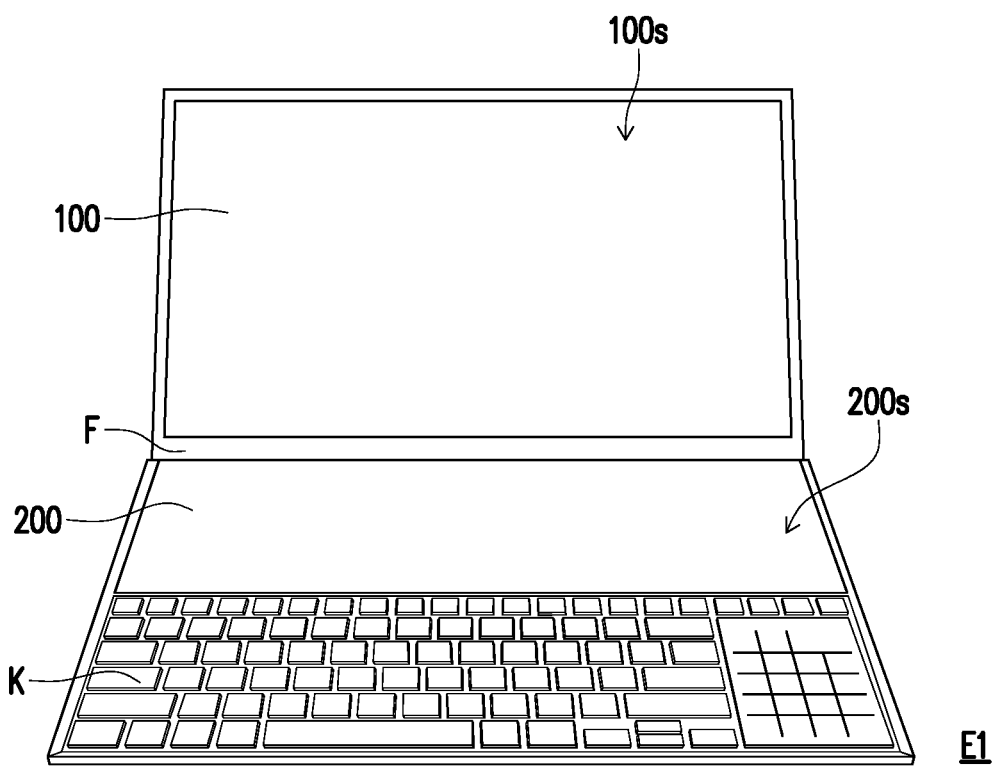
FIG. 8A is a schematic view of an electronic device according to the first embodiment of the disclosure.

FIG. 8A is a schematic view of an electronic device according to the first embodiment of the disclosure.

Please refer to FIG. 8A. An electronic device E1 may, for example, include the display device, a frame body F, a processor (not shown), and a keyboard K, wherein the display device may be, for example, one of the display devices 10a to 10e, but the disclosure is not limited thereto.

In detail, the electronic device E1 includes, for example, the first display panel 100 and the second display panel 200, wherein the first display panel 100 and the second display panel 200 may be, for example, one of the configurations shown in FIG. 6A to FIG. 6E, which will not be repeated here. The frame body F is, for example, joined to the first display panel 100 and the second display panel 200, wherein the first display panel 100 may be, for example, rotated relative to the second display panel 200 through a pivot (not shown) in the frame body F, but the disclosure is not limited thereto. For example, the processor is disposed inside the frame body F and is electrically connected to the first display panel 100 and the second display panel 200, wherein the first display panel 100 and the second display panel 200 may, for example, display the same or different display images based on image signals received from the processor. The keyboard K may, for example, be operated by the user, and provide a corresponding command signal to the processor after being operated. The processor may, for example, enable the first display panel 100 and/or the second display panel 200 to display an image or update an image based on the command signal.

In the embodiment, the first display surface 100s of the first display panel 100 and the second display surface 200s of the second display panel 200 may have the same length and/or width in a specific direction, but the disclosure is not limited thereto. In addition, in the embodiment, the first display surface 100s of the first display panel 100 and the second display surface 200s of the second display panel 200 face different directions, but the disclosure is not limited thereto.

Figure 8B:
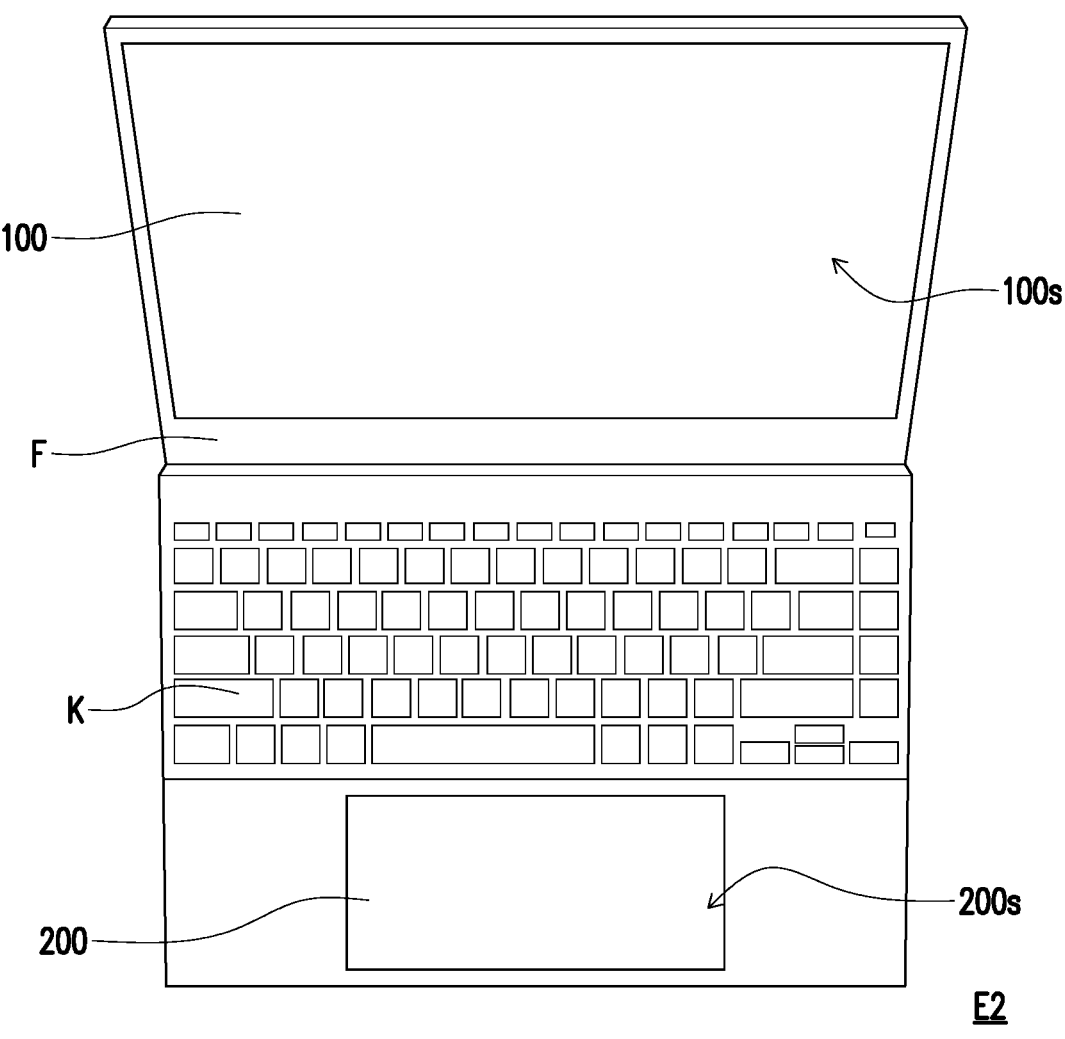
FIG. 8B is a schematic view of an electronic device according to the second embodiment of the disclosure.

FIG. 8B is a schematic view of an electronic device according to the second embodiment of the disclosure. It should be noted that the embodiment of FIG. 8B may continue to use the reference numerals and some content of the embodiment of FIG. 8A, wherein the same or similar reference numerals are adopted to indicate the same or similar elements, and the description of the same technical content is omitted.

Please refer to FIG. 8B. The main difference between an electronic device E2 of the embodiment and the electronic device E1 is that the first display surface 100s of the first display panel 100 and the second display surface 200s of the second display panel 200 have different lengths and widths. In the embodiment, the first display surface 100s of the first display panel 100 has a length and width greater than those of the second display surface 200s of the second display panel 200.

Figure 9A:
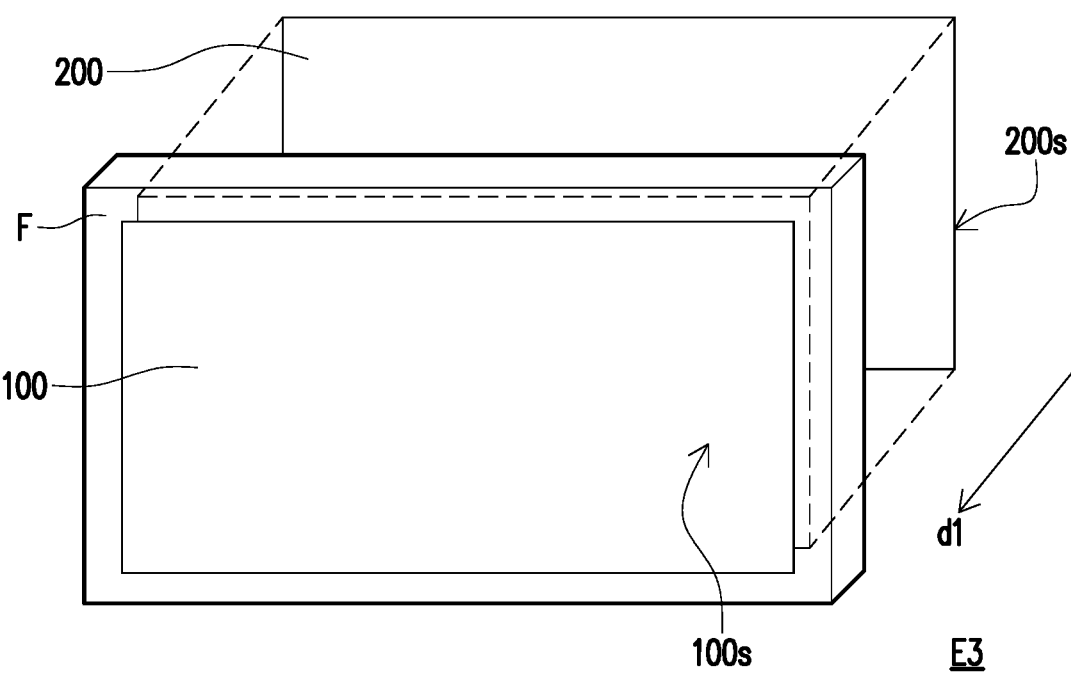
FIG. 9A is a schematic view of an electronic device according to the third embodiment of the disclosure.

FIG. 9A is a schematic view of an electronic device according to the third embodiment of the disclosure. It should be noted that the embodiment of FIG. 9A may continue to use the reference numerals and some content of the embodiment of FIG. 8A, wherein the same or similar reference numerals are adopted to indicate the same or similar elements, and the description of the same technical content is omitted.

Please refer to FIG. 9A. The main difference between an electronic device E3 of the embodiment and the electronic device E1 is that the first display surface 100s of the first display panel 100 and the second display surface 200s of the second display panel 200 face opposite directions, and the first display surface 100s of the first display panel 100 and the second display surface 200s of the second display panel 200 at least partially overlap in the first direction d1.

Figure 9B:
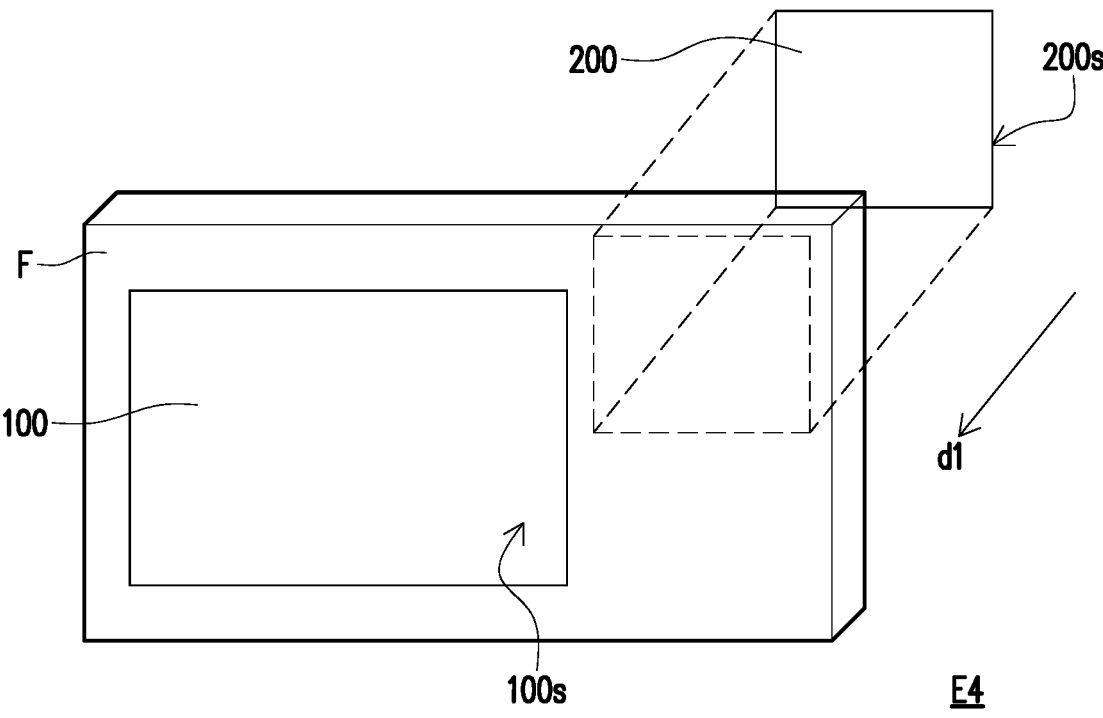
FIG. 9B is a schematic view of an electronic device according to the fourth embodiment of the disclosure.

FIG. 9B is a schematic view of an electronic device according to the fourth embodiment of the disclosure. It should be noted that the embodiment of FIG. 9B may continue to use the reference numerals and some content of the embodiment of FIG. 9A, wherein the same or similar reference numerals are adopted to indicate the same or similar elements, and the description of the same technical content is omitted.

Please refer to FIG. 9B. The main difference between an electronic device E4 of the embodiment and the electronic device E3 is that the first display surface 100s of the first display panel 100 does not overlap with the second display surface 200s of the second display panel 200 in the first direction d1.

In summary, through enabling the glossiness of the first optical structure layer in the display device provided by the embodiments of the disclosure to be between 4 GU and 35 GU and the reflectivity of SCI of the first optical structure layer to be between 3% and 6%, the display device of the embodiments of the disclosure can have relatively low glossiness and relatively low reflectivity of SCI, so as to improve the anti-glare performance of the display device of the embodiments of the disclosure to effectively scatter ambient light from the outside. Based on this, the influence of reflection of ambient light from the outside can be reduced when the user views the electronic device including the display device of the embodiments of the disclosure to experience the display device with high display quality.

Furthermore, when the display device provided by the embodiments of the disclosure is applied to the technology of the double-sided liquid crystal display device, the arrangement of a light guide plate may be omitted compared with the conventional double-sided liquid crystal display device, so the display device of the embodiments of the disclosure can have a relatively small thickness and/or can reduce power consumption.

Finally, it should be noted that the above embodiments are only used to illustrate, but not to limit, the technical solutions of the disclosure. Although the disclosure has been described in detail with reference to the above embodiments, persons skilled in the art should understand that the technical solutions described in the above embodiments may still be modified or some or all of the technical features thereof may be equivalently replaced. However, the modifications or replacements do not cause the essence of the corresponding technical solutions to deviate from the scope of the technical solutions of the embodiments of the disclosure.

What is claimed is:

1. A display device, comprising:
a first display panel, having a first display surface emitting light toward a first direction;
a second display panel, having a second display surface emitting light toward a second direction, wherein the first direction is different from the second direction; and
a first optical structure layer, disposed on the first display surface,
wherein a glossiness of the first optical structure layer is between 4 GU and 35 GU, and a reflectivity of specular component included (SCI) of the first optical structure layer is between 3% and 6%.

2. The display device according to claim 1, further comprising a second optical structure layer, wherein the second optical structure layer is disposed on the second display surface, a glossiness of the second optical structure layer is between 4 GU and 35 GU, and a reflectivity of SCI of the second optical structure layer is between 3% and 6%.

3. The display device according to claim 1, further comprising a backlight module, wherein the backlight module is disposed between the first display panel and the second display panel, and the backlight module comprises:

a light guide plate, having a first light emitting surface facing the first display panel and a second light emitting surface facing the second display panel; and a light source, used to provide light to the light guide plate, wherein a brightness of light emitted from the first light emitting surface is different from a brightness of light emitted from the second light emitting surface.

4. The display device according to claim 3, wherein the first light emitting surface has a plurality of first microstructures, the second light emitting surface has a plurality of second microstructures, and a number of the first microstructures per unit area is different from a number of the second microstructures per unit area.

5. The display device according to claim 3, wherein the first light emitting surface has a plurality of first microstructures, the second light emitting surface has a plurality of second microstructures, a surface of the first microstructures is one of a curved surface and a plane, and a surface of the second microstructures is other one of the curved surface and the plane.

6. The display device according to claim 1, wherein the first display panel is one of an organic light emitting diode display panel, a micro light emitting diode display panel, a mini light emitting diode display panel, a liquid crystal display panel, a cholesteric liquid crystal display panel, and an electronic paper display panel.

7. The display device according to claim 1, wherein the glossiness of the first optical structure layer is further between 4 GU and 30 GU.

8. The display device according to claim 7, wherein the glossiness of the first optical structure layer is further between 4 GU and 20 GU.

9. The display device according to claim 1, wherein a transmittance of the first optical structure layer is between 70% and 98%.

10. The display device according to claim 9, wherein the transmittance of the first optical structure layer is further between 70% and 95%.

11. The display device according to claim 1, wherein the reflectivity of SCI of the first optical structure layer is between 4% and 6%.

12. The display device according to claim 1, wherein the first optical structure layer comprises an anti-glare layer and an anti-reflection layer, wherein the anti-reflection layer is disposed on the anti-glare layer.

13. The display device according to claim 12, wherein the anti-reflection layer comprises a plurality of high refractive index sublayers and a plurality of low refractive index sublayers stacked alternately.

14. The display device according to claim 13, wherein a total number of the high refractive index sublayers and the low refractive index sublayers is greater than or equal to 4.

15. The display device according to claim 13, wherein a material of the high refractive index sublayers is indium tin oxide.

16. The display device according to claim 1, further comprising a frame body, wherein the frame body is joined to the first display panel and the second display panel.

17. The display device according to claim 1, further comprising a backlight module, wherein the backlight module is used to provide light to the first display panel, and a difference between an angle of a viewing angle corresponding to half of intensity of the light and an angle of a center viewing angle is greater than 40 degrees.

18. The display device according to claim 17, wherein the backlight module comprises an upper diffusion sheet and a lower diffusion sheet, and the upper diffusion sheet is directly disposed on the lower diffusion sheet.

19. The display device according to claim 18, wherein the backlight module further comprises a dual brightness enhancement film, and the dual brightness enhancement film is disposed on the upper diffusion sheet.

20. The display device according to claim 1, wherein the first display surface of the first display panel and the second display surface of the second display panel at least partially overlap in the first direction.

* * * * *